Feb. 16, 1971 R. L. NELSON 3,564,572
METHOD AND APPARATUS FOR MEASURING THE FREQUENCY OF
VIBRATION OF AN OBJECT USING HOLOGRAMS
Filed Dec. 11, 1967
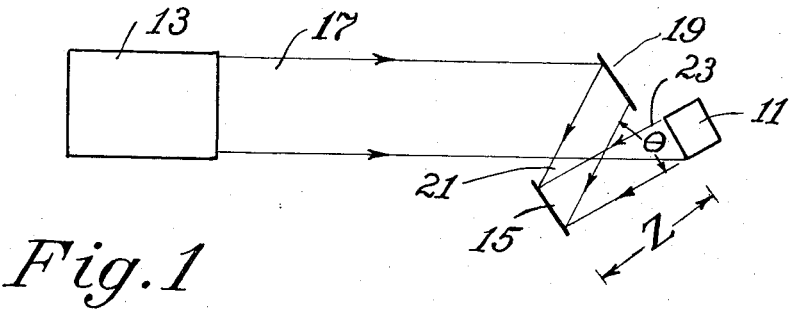
*Fig. 1*
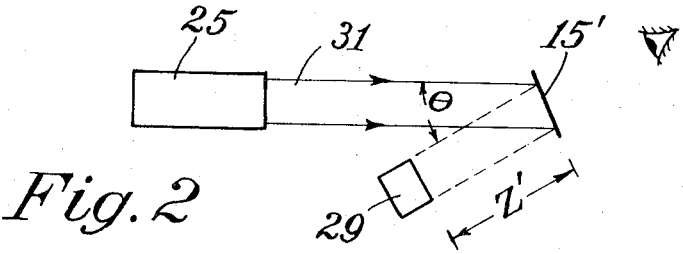
*Fig. 2*
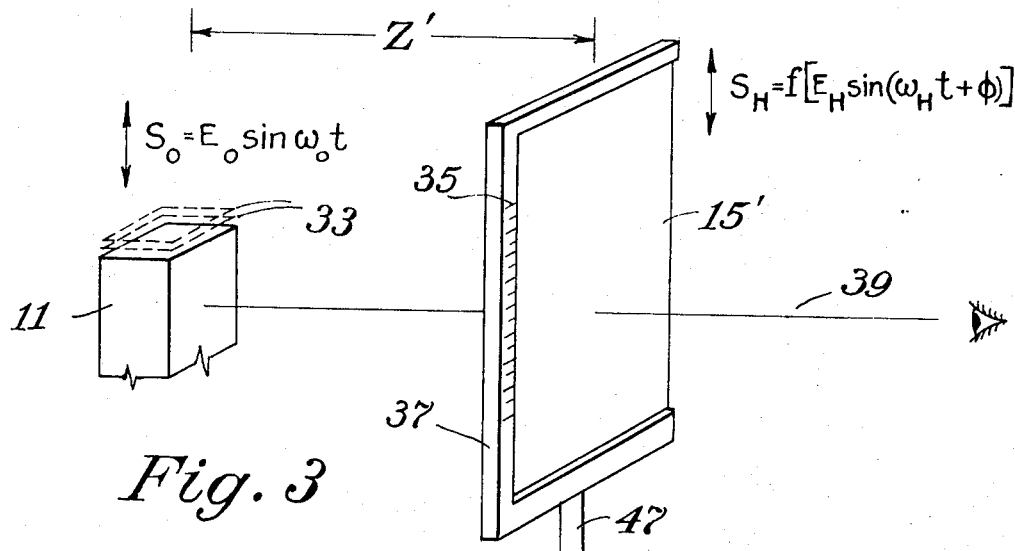
*Fig. 3*
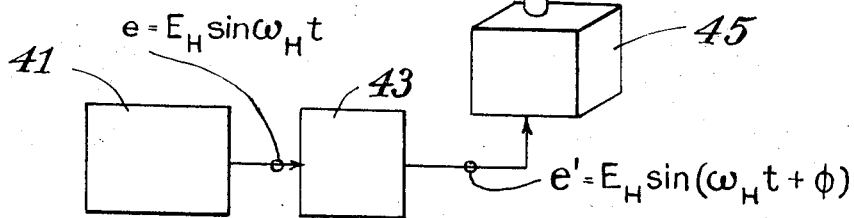

United States Patent Office 3,564,572
Patented Feb. 16, 1971

3,564,572
METHOD AND APPARATUS FOR MEASURING THE FREQUENCY OF VIBRATION OF AN OBJECT USING HOLOGRAMS
Richard L. Nelson, 179 W. Granville Road, Worthington, Ohio 43085
Filed Dec. 11, 1967, Ser. No. 689,589
Int. Cl. G01h
U.S. Cl. 73—71.3
10 Claims

ABSTRACT OF THE DISCLOSURE

Measuring the amplitude and frequency of vibration of a solid object wherein a hologram is made of the object under investigation and an image of this object is reconstructed and vibrated for use in comparing its controlled vibration with that of the object.

BACKGROUND OF THE INVENTION

This invention relates generally to a method and apparatus for measuring the amplitude and frequency of vibration of solid objects. More specifically, this invention relates to the use of holography in making these measurements.

One type of existing vibration analyzer utilizes a transducer attached to the vibrating object and provides an electrical signal proportional to the velocity or acceleration of the object. The electrical output signal of the transducer has a frequency proportional to the frequency of the vibrating object. A fixed or tuneable frequency filter is generally used to operate on this signal to determine its frequency.

A major limitation of this technique for frequency measurement is that a transducer must be mechanically fixed to the vibrating object. For certain objects, the affixed transducer is likely to alter the characteristics of vibration from that of normal operating conditions when no transducer is so attached. Also, many objects for which it is desirable to measure the frequency of vibration are too small to accommodate even the smallest transducers currently available. Additionally, presently available transducers have a limited range of operation in terms of the frequency and amplitude of the vibration which they can be used to measure. Further, it may be desirable to measure the characteristics of the vibration of an object in an environment in which a transducer may not operate properly, such as in heat or in a strong field of electromagnetic radiation.

A second type of existing vibration analyzer utilizes an oscillating light beam which is reflected from the object under investigation onto a photo-electric device which monitors the frequency of vibration. A limitation of this technique for frequency measurement is that complex electronics are necessary to determine the frequency of vibration. Furthermore, certain types of objects do not lend themselves to a light reflective technique, such as objects too small to reflect a light spot or those objects which absorb or disperse the incident light beam.

SUMMARY OF THE INVENTION

Briefly, the improved technique of this invention for vibration analyzing includes the making of an off-axis hologram of the object whose motion is to be measured, and reconstructing a three-dimensional image of this object in a position to be coincident with it. The amplitude of vibration may be determined by measuring the displacement if vibrating object from its stationary image. A means for vibrating the image of the object at various frequencies is provided. The frequency at which the image of the object and the object appear to be coincidently vibrating is the frequency of vibration of the object, the desired quantity.

An important advantage of this method and of the apparatus for carrying it out is that the amplitude and frequency of vibration of solid objects may be determined without having to physically contact the object. Also, this invention allows the determination of these characteristics in a far wider range of environmental conditions than is presently possible. In addition, the present invention allows determination of the amplitude and frequency over a far wider range of oscillation than may now be determined by presently used techniques. Furthermore, the present invention is an improvement over existing light techniques since less complex apparatus need be employed, thus reducing the cost of determining vibration characteristics, and further may be used with objects that do not have a high degree of reflectance.

The present invention is particularly pointed out and distinctly claimed in the appended claims. However, in order to understand the invention and its applications and preferred embodiments, the following description is presented which should be taken in conjunction with the drawings.

BRIEF DESCRIPTION OF THE DRAWINGS

FIG. 1 diagrammatically shows a configuration for making an off-axis hologram which may be utilized to carry out the present invention.

FIG. 2 diagrammatically shows a configuration for image reconstruction of a hologram made according to the configuration of FIG. 1.

FIG. 3 demonstrates the method and an apparatus of the present invention in its preferred embodiment for vibration analysis of solid objects.

DESCRIPTION OF THE PREFERRED EMBODIMENTS

The present invention utilizes a recently developed technique of off-axis holography. This technique allows the reconstruction of a three-dimensional image of an object in free space without requiring the use of lenses.

Referring to FIGS. 1 and 2, the method for such image reconstruction will be briefly described. An object 11 is illuminated by a coherent light source 13 in a manner to be reflected upon an unexposed photographic film 15 located a distance Z from the object 11. The coherent light source 13 is generally a laser with a pinhole and lenses to provide a beam of coherent light 17 with a controlled angle of beam spread. A mirror 19 is positioned to reflect part of the light beam 17 onto the photographic film 15 to there interfere with the light being reflected from the object 11. The angle $\theta$ is the angle between the reference beam 21 and the object beam 23 and is a value from something greater than 0° to something a little less than 90°. The resulting light intensity distribution recorded at the photographic film 15 is a plurality of superimposed Fresnel-like interference patterns associated with each point on the face of the object 11.

After exposure to this interference pattern, photographic film 15 is developed in the normal manner to become a hologram 15'. When illuminated with a monochromatic light source 25, the hologram 15' produces two images of the object 11. A virtual image 29 is a three-dimensional reconstruction of the object 11 which may be viewed by looking through the hologram 15'. A real image (not shown) is also produced on the observer's side of the hologram 15'. The image 29 is reconstructed a distance Z' from the hologram 15' and is positioned at the angle $\theta$ with respect to the monochromatic reconstructing light beam 31. The size of the reconstructed image 29 relative to the size of the object 11 and the relationship between Z and Z' are dependent upon the relative frequencies of light sources 13 and 25 and also upon the spread angle (convergence or divergence) of light beams 17 and 31. If the same apparatus is used for light sources 13 and 25, as is the preferred condition for the present invention, the size of the reconstructed image 29 is equal to the size of the object 11 and Z=Z'. It is essential for such equality that the frequency and angle of beam spread of the sources 13 and 25 be equal.

With reference to FIG. 3, a hologram 15' may be made of the object 11 under investigation, according to the aforementioned technique with reference to FIG. 1. A reconstructing light source (not shown) is placed on the object side of the hologram 15' which is positioned so that its virtual image will be coincident with the object 11 while at rest, as viewed through hologram 15'. To aid in aligning the image to be coincident with the object, it is preferable to place the hologram 15' in the same position relative to the object 11 as it was when the hologram was made and then reconstruct the three-dimensional image of the object 11 with the same light source that was used in the hologram construction. If the hologram 15' is held stationary and the object 11 is allowed to vibrate under the conditions under investigation, a blurred area 33 will appear to the observer through the hologram 15' relative to the stationary reconstructed image of the object. The height of this blurred area is proportional to the amplitude of the vibration and may be measured by use of a scale 35 printed upon the hologram supporting frame 37. The scale 35 may be in conventional units and will indicate directly the maximum amplitude of the vibration if the plane in which object 11 is vibrating and the plane of hologram 15' are approximately parallel and if the line of sight 39 is approximately perpendicular to these planes. If these conditions are not met, a constant factor could be applied to a scale 35 of normal units in order to adjust for the various angles involved.

Assuming the object 11 is vibrating according to the expression, $$S_0 = E_0 \sin \omega_0 t$$

where $S_0$ represents the position of a point on the object at any given instant,
$E_0$ represents the maximum amplitude of the vibration,
$\omega_0$ is equal to the frequency of vibration in radians, and
$t$ is equal to time.

In this case, the maximum blurred area 33 would be equal to $2E_0$.

The frequency of vibration of the object 11 may be determined by controllably oscillating an image of the object until the object and its image visually appear to be coincident. Referring to FIG. 3, the image reconstructd from the hologram 15', which is coincident with the object 11 while both are at rest, may be oscillated at the amplitude hereinabove determined for the vibration of the object 11 and at a frequency wherein the blurred area 33 is eliminated. The frequency of oscillation of the image may be determined by reference to the frequency of its driving source.

There are many ways in which a holographically reconstructed image could be made to oscillate and a preferred method is illustrated in FIG. 3, wherein the hologram 15' itself is made to oscillate. The electronic oscillator 41 may be of standard circuitry well known in the art to produce a sine wave output of the form, $$e = E_H \sin \omega_H t$$

where $e$ is the instantaneous voltage output,
$E_H$ is the maximum voltage,
$\omega_H$ is the frequency of the oscillations in radians, and
$t$ is time.

A phase-shifting network 43 provides for adjusting the phase of the oscillator output. A driving source 45 has its mechanical output connected to the hologram frame 37 by means of an element 47, and may be any one of the many power sources known which produce a reciprocating mechanical output in response to an alternating current input. The motion of hologram 15' is then a function of the output of oscillator 41 whose frequency and phase may be adjusted until the image reconstructed from hologram 15' is coincident with the vibrating object 11 as evidenced by the disappearance of the fringes 33. When this condition occurs, the frequency of vibration of object 11 is equal to the output frequency of oscillator 41.

It may be that the object 11 is not vibrating in a sinusoidal manner; nevertheless, the forementioned technique remains valuable to determine the fundamental frequency of vibration. The hologram 15' is made to oscillate with an amplitude equal to that which has been determined to be the amplitude equal to that which has been determined to be the amplitude of vibration of object 11, and oscillator 41 is then adjusted to find the frequency where the blurred area 33 becomes of minimum intensity.

It should become apparent to those skilled in the art that the aforementioned technique may be used on complex machine elements wherein the object imaged is a portion of a machine element under investigation as the subject of a hologram for vibration analysis. The phase-shifting circuit 43 makes it possible to determine the phase of vibration and allows comparing the relative phase of vibration at different parts of a machine or at various portions of a single machine element.

It shall be understood the invention is not limited to the specific arrangements shown, and that changes and modifications may be made within the scope of the appended claims.

What is claimed is:

1. A method for determining the frequency of vibration of an object, comprising the steps of:
holographically reconstructing a three-dimensional image of said object in a manner that the image is the same size as the object,
positioning the image to appear coincident with the object in its rest position,
subjecting the object to vibration of unknown frequency,
controllably vibrating said image without changing its size or proportions and at a frequency to cause the image and the object to appear to be coincident in at least one observable direction, and
measuring the frequency of vibration of said image, thereby to determine the frequency of vibration of said object.

2. The method of claim 1 wherein said three-dimensional image is controllably vibrated by giving reciprocal motion of a known frequency to said hologram in a direction parallel to said at least one observable direction.

3. Apparatus for determining the frequency and phase of vibration of an object, comprising,
means employing a source of coherent light for reconstructing from a hologram a three-dimensional image of said object that is the same size thereof and in a position coincident with said object while at rest, and
means vibrating said hologram for causing said image to be controllably vibrated without a change in its size or proportions to appear along a line of sight to be coincident with said vibrating object in a given direction substantially perpendicular to said line of sight, thereby permitting a determination of the frequency and phase of said object vibration by measuring the frequency and phase at which said image is caused to vibrate.

4. The apparatus of claim 3 wherein said means vibrating said hologram includes means for vibrating said hologram along a path substantially parallel with said given direction.

5. The apparatus of claim 4 wherein said means to vibrate said hologram includes:
   an electronic oscillator with an alternating current of a controllable frequency,
   a mechanical oscillating means connected to said hologram and operable in response to an input of alternating electric current, and
   an electrical network having controllable phase-shifting properties toward alternating currents and connected between the output of said electronic oscillator and the input of said mechanical oscillator.

6. A method for determining the amplitude of vibration of an object, comprising the steps of:
   reconstructing from a hologram a three-dimensional image the same size as said object that is observable upon looking through the hologram along a line of sight, said image being positioned to be coincident with the rest position of said object,
   subjecting the object to unknown vibrational amplitudes, and
   measuring the maximum displacement of said object from its three-dimensional image in a direction generally perpendicular to said line of sight and thereby determining the amplitude of vibration of said object in said direction.

7. The method of claim 6 wherein said measurement of maximum displacement is made by viewing said object and said image through said hologram and using a measurement scale at said hologram.

8. A method of determining characteristics of an object's vibration along a given straight line path, comprising the steps of:
   illuminating the object in a rest position with a beam of coherent radiation, thereby to produce an object-modified beam,
   positioning a hologram detector in the path of the object-modified beam and substantially parallel to said given straight line path,
   directing a reference radiation beam mutually coherent with said object illuminating radiation beam onto the hologram detector at a finite angle therewith, said reference beam having a given wavefront curvature thereacross upon striking the hologram detector, whereby a hologram is constructed,
   directing a coherent reconstructing radiation beam onto said hologram at substantially the same angle therewith as said reference beam angle, said reconstructing radiation beam caused to strike said hologram with a wavefront having substantially the same curvature as that of said reference beam, said reconstructing radiation beam additionally being of substantially the same wavelength as the reference radiation beam, whereby a virtual image the same size of said object is reconstructed from the hologram,
   positioning the reconstructed virtual image in coincidence with said object at rest,
   vibrating said object,
   observing the image and vibrating object by looking through the hologram along a line of sight, and
   determining the amplitude of vibration of said object along said given straight line path generally perpendicular to said line of sight by noting the maximum displacement along said path of the object from the image.

9. The method of determining characteristics of an object's vibration along a given straight line path as defined in claim 8, which comprises the additional steps of:
   vibrating said hologram in a direction parallel with said given straight line path and in a manner to maintain the virtual image size and proportions constant, said hologram vibration having substantially same amplitude as that of said object along said path, and
   adjusting the frequency of vibration of said hologram until said reconstructed image and said object appear to be coincident, whereby the frequency of the object's vibration along said given straight line path may be determined by noting the frequency of vibration of said hologram.

10. A method of determining the frequency of vibration of an object, comprising the steps of:
   illuminating the object in a rest position with a beam of coherent radiation, thereby to produce an object-modified beam,
   positioning a hologram detector in the path of the object-modified beam and substantially parallel to said given straight line path,
   directing a reference radiation beam mutually coherent with said object illuminating radiation beam onto the hologram detector at a finite angle therewith, said reference beam having a given wavefront curvature thereacross upon striking the hologram detector, whereby a hologram is constructed,
   directing a coherent reconstructing radiation beam onto said hologram at substantially the same angle therewith as said reference beam angle, said reconstructing radiation beam caused to strike said hologram with a wavefront having substantially the same curvature as that of said reference beam, said reconstructing radiation beam additionally being of substantially the same wavelength as the reference radiation beam, whereby a virtual image the same size of said object is reconstructed from the hologram,
   positioning the reconstructed image in coincidence with said object at rest,
   vibrating said object, and
   vibrating the hologram along a given path in a manner to maintain the virtual image size and proportions constant while adjusting the amplitude and frequency of said vibration until said image appears to be coincident with said object along said given path.

References Cited

Bowie, G. E.: Interferometric Measurement of Vibration Amplitudes, Applied Optics, vol. 2, No. 10, October 1963, pp. 1061–1067.

Holographic Vibration Analysis, Etc.; Laser Focus, September 1966, pp. 31–33.

Measuring the Amplitude of Vibration of a Reed, Scherr, H. J., Materials Research and Standards, vol. 6, No. 12, December 1966, pp. 614–616.

RICHARD C. QUEISSER, Primary Examiner

J. P. BEAUCHAMP, Assistant Examiner

U.S. Cl. X.R.

350—3.5

PO-1050
(5/69)

UNITED STATES PATENT OFFICE
CERTIFICATE OF CORRECTION

Patent No. 3,564,572          Dated February 16, 19:

Inventor(s) Richard Nelson

It is certified that error appears in the above-identified pa and that said Letters Patent are hereby corrected as shown below:

Column 1, between lines 6 and 7 insert --assignor to Holotron Corporation, Wilmington, Delaware, a corporation of Delaware.--

Column 1, line 70, "if" should be --of the--.

Column 4, lines 20 and 21 the words "equal to that which has been determined to be the amplitude" have been repeat from the previous sentence.

Signed and sealed this 9th day of November 1971.

(SEAL)
Attest:

EDWARD M. FLETCHER, JR.
Attesting Officer

ROBERT GOTTSCHALK
Acting Commissioner of Patents